United States Patent
Botman et al.

(10) Patent No.: US 11,550,735 B1
(45) Date of Patent: Jan. 10, 2023

(54) REGION MISMATCH PREDICTION FOR MEMORY ACCESS CONTROL CIRCUITRY

(71) Applicant: Arm Limited, Cambridge (GB)

(72) Inventors: François Christopher Jacques Botman, Cambridge (GB); Thomas Christopher Grocutt, Cambridge (GB); Jack William Derek Andrew, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/486,639

(22) Filed: Sep. 27, 2021

(51) Int. Cl.
*G06F 13/00* (2006.01)
*G06F 13/16* (2006.01)
*G06F 12/02* (2006.01)

(52) U.S. Cl.
CPC ...... *G06F 13/1631* (2013.01); *G06F 12/0238* (2013.01); *G06F 13/1642* (2013.01); *G06F 13/1668* (2013.01)

(58) Field of Classification Search
CPC ............. G06F 13/1631; G06F 12/0238; G06F 13/1642; G06F 13/1668; G06F 12/00; G06F 13/00
See application file for complete search history.

(56) References Cited

U.S. PATENT DOCUMENTS

| | | | | |
|---|---|---|---|---|
| 5,907,867 A | * | 5/1999 | Shinbo | G06F 12/1027 711/212 |
| 6,826,245 B1 | * | 11/2004 | Brown | H04L 7/08 375/368 |
| 2005/0163121 A1 | * | 7/2005 | Asano | H04L 45/54 370/389 |
| 2008/0123663 A1 | * | 5/2008 | Kanagala | H04L 45/02 370/395.32 |

* cited by examiner

*Primary Examiner* — Tuan V Thai
(74) *Attorney, Agent, or Firm* — Nixon & Vanderhye P.C.

(57) ABSTRACT

Memory access control circuitry controls handling of a memory access request based on at least one memory access control attribute associated with a region of address space including the target address. The memory access control circuitry comprises: lookup circuitry comprising a plurality of sets of comparison circuitry, each set of comparison circuitry to detect, based on at least one address-region-indicating parameter associated with a corresponding region of address space, whether the target address is within the corresponding region of address space; region mismatch prediction circuitry to provide a region mismatch prediction indicative of which of the sets of comparison circuitry is predicted to detect a region mismatch condition; and comparison disabling circuitry to disable at least one of the sets of comparison circuitry that is predicted by the region mismatch prediction circuitry to detect the region mismatch condition for the target address.

20 Claims, 6 Drawing Sheets

REGION MISMATCH PREDICTION FOR MEMORY ACCESS CONTROL CIRCUITRY

BACKGROUND

Technical Field

The present technique relates to the field of data processing.

Technical Background

A data processing apparatus may have processing circuitry for performing data processing operations. The processing circuitry may issue memory access requests specifying a target address identifying a location to be accessed in a memory system. It may be desirable to define access control attributes which control handling of the memory access request. For example, the access control attributes can define whether certain software processes are allowed to access certain regions of an address space. For example, the access permissions could specify whether a certain address region is read-only, or can be both readable and writeable, or could specify which privilege levels are allowed to access the corresponding address region. It may also be desirable to control whether an area of memory is executable. Such execute permissions may be conditional on privilege level, for example it may be desirable to permit unprivileged execution of an area of memory but prohibit execution in a privileged mode. When an access is granted it may also be desirable to perform the access according to attributes associated with a certain address region, for example whether caching, buffering, combining or reordering accesses for the address region is permitted.

SUMMARY

At least some examples of the present technique provide an apparatus comprising:
processing circuitry to issue a memory access request specifying a target address; and
memory access control circuitry to control handling of the memory access request based on at least one memory access control attribute associated with a region of address space including the target address;
the memory access control circuitry comprising:
lookup circuitry to perform an attribute lookup for the memory access request to identify the at least one memory access control attribute associated with the region of address space including the target address, the lookup circuitry comprising a plurality of sets of comparison circuitry, each set of comparison circuitry to detect, based on at least one address-region-indicating parameter associated with a corresponding region of address space, whether the target address is within the corresponding region of address space;
region mismatch prediction circuitry to provide a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry; and
comparison disabling circuitry to disable at least one of the plurality of sets of comparison circuitry that is predicted by the region mismatch prediction circuitry to detect the region mismatch condition for the target address.

At least some examples of the present technique provide a method comprising:
issuing a memory access request specifying a target address; and
controlling handling of the memory access request based on at least one memory access control attribute associated with a region of address space including the target address;
the controlling comprising:
performing an attribute lookup for the memory access request to identify the at least one memory access control attribute associated with the region of address space including the target address, the attribute lookup performed using lookup circuitry comprising a plurality of sets of comparison circuitry, each set of comparison circuitry to detect, based on at least one address-region-indicating parameter associated with a corresponding region of address space, whether the target address is within the corresponding region of address space;
providing a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry; and
disabling at least one of the plurality of sets of comparison circuitry that is predicted to detect the region mismatch condition for the target address.

At least some examples of the present technique provide a non-transitory computer-readable medium to store computer-readable code for fabrication of an apparatus comprising:
processing circuitry to issue a memory access request specifying a target address; and
memory access control circuitry to control handling of the memory access request based on at least one memory access control attribute associated with a region of address space including the target address;
the memory access control circuitry comprising:
lookup circuitry to perform an attribute lookup for the memory access request to identify the at least one memory access control attribute associated with the region of address space including the target address, the lookup circuitry comprising a plurality of sets of comparison circuitry, each set of comparison circuitry to detect, based on at least one address-region-indicating parameter associated with a corresponding region of address space, whether the target address is within the corresponding region of address space;
region mismatch prediction circuitry to provide a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry; and
comparison disabling circuitry to disable at least one of the plurality of sets of comparison circuitry that is predicted by the region mismatch prediction circuitry to detect the region mismatch condition for the target address.

Further aspects, features and advantages of the present technique will be apparent from the following description of examples, which is to be read in conjunction with the accompanying drawings.

DESCRIPTION OF EXAMPLES

Figure 1:
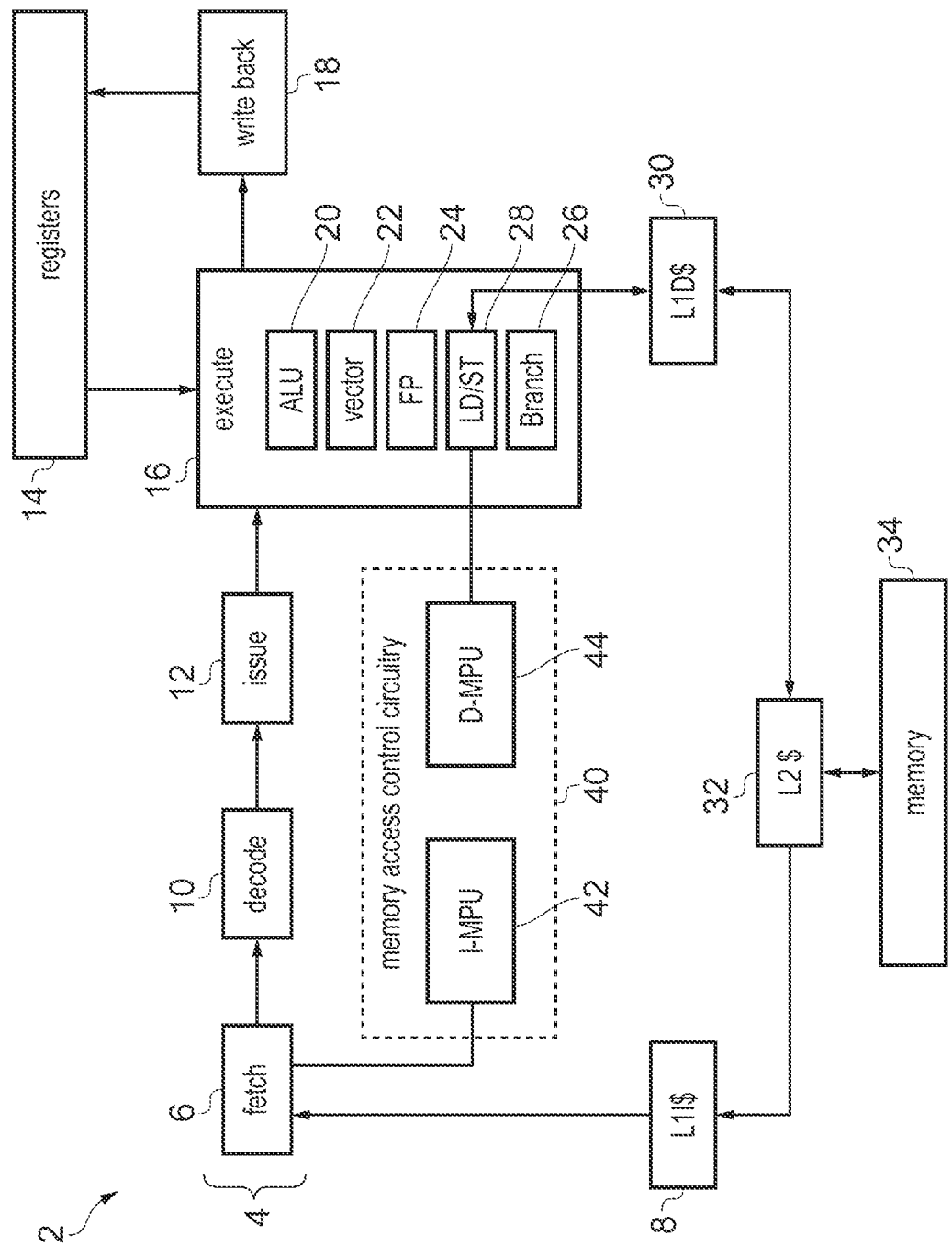
FIG. 1 illustrates an example of a data processing apparatus having memory access control circuitry.

An apparatus comprises processing circuitry to issue a memory access request specifying a target address, and memory access control circuitry to control handling of the memory access request based on at least one memory access control attribute associated with a region of address space including the target address. To enable the memory access control circuitry to determine which memory access control attribute(s) should be checked for a particular memory access, the memory access control circuitry has lookup circuitry to perform an attribute lookup for the memory access request to identify the at least one memory access control attribute associated with the region of address space including the target address. The lookup circuitry comprises two or more sets of comparison circuitry, each set of comparison circuitry to detect, based on at least one address-region-indicating parameter associated with a corresponding region of address space, whether the target address is within the corresponding region of address space.

Such lookups of memory access control attributes can consume a significant amount of power, because memory access requests are relatively frequent and for each memory access request the address may need to be compared against address-region-indicating parameters associated with multiple regions of address space. However, in practice most of the regions for which the address-region-indicating parameters are compared with the target address of a given memory access will encounter a region mismatch condition where the target address is found not to be within that region of address space. Some architectures may prescribe that there cannot be any overlapping regions defined using the address-region-indicating parameters, and so in this case only one region can encounter a region match condition. Even if an architecture allows overlapping regions to be defined, in practice the number of regions which match against any given address will still tend to be relatively low and the number of regions encountering a region mismatch condition is generally expected to be higher than the number of regions encountering a region match condition.

The inventors have recognised that since such memory attribute lookups are dependent on software-issued addresses, they tend to exhibit spatial/temporal locality, so that consecutive lookups are likely to access similar areas of memory and therefore often will match against the same region or a limited set of regions. Therefore, checking the target address of a memory access against all regions can often be redundant, and power can be saved by reducing the number of regions for which the comparison circuitry is active in comparing the target address against the at least one address-region-indicating parameter associated with a corresponding region of address space.

Hence, the memory access control circuitry comprises region mismatch prediction circuitry to provide a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry. The memory access control circuitry also comprises comparison disabling circuitry to disable at least one of the plurality of sets of comparison circuitry that is predicted by the region mismatch prediction circuitry to detect the region mismatch condition for the target address. This allows power consumption to be reduced.

The particular way in which a given set of comparison circuitry is disabled can vary between different implementations. In some implementations a set of comparison circuitry that is disabled may be power gated to suppress or reduce supply of power to the set of comparison circuitry. Alternatively, the set of comparison circuitry that is disabled may remain powered, but inputs supplied to the comparison circuitry for a particular lookup can be clamped to a fixed value such as 0 when that set of comparison circuitry is disabled. This helps to reduce dynamic power consumption because clamping the inputs can reduce the number of stored bits and signals on circuit signal paths that change state between 0 and 1 (such toggling of bit values tends to increase power consumption).

If, in the lookup performed when at least one of the sets of comparison circuitry is disabled, one of the enabled sets of comparison circuitry detects a region match condition when the target address is found to be within the corresponding region of address space associated with one of the enabled sets of comparison circuitry, then the at least one memory access control attributes associated with the matching region can be used to control handling of the memory access request, and no further lookup of attribute data may be required.

However, sometimes after the lookup is performed with at least one of the sets of comparison circuitry disabled, the outcome of the lookup may be that all of the enabled sets of comparison circuitry detect that the target address is outside their corresponding region of address space, so that none of the regions checked by the enabled sets of comparison circuitry detects a region match condition. In this case, at least one of the sets of comparison circuitry which was previously disabled can be re-enabled, and the attribute lookup can be repeated. Hence, in response to the attribute lookup identifying that the region mismatch condition is detected for the target address by each enabled set of comparison circuitry when at least one of the plurality of sets of comparison circuitry was disabled for the attribute lookup, the comparison disabling circuitry is configured to re-enable at least one previously disabled set of comparison circuitry and the lookup circuitry is configured to repeat the attribute lookup for the given target address with the at least one previously disabled set of comparison circuitry now enabled. While this approach may cause a little extra latency on the rare occasions when the initial lookup mismatches against all the regions associated with enabled comparison circuitry, in practice this latency may be tolerated as the frequency of this occurring may be relatively low and this latency penalty may be outweighed by the greater power savings achieved by disabling sets of comparison circuitry for the majority of memory accesses which exhibit spatial/temporal locality for which the comparison circuitry expected to hit can be predicated reasonably accurately in advance.

In some implementations, when the lookup has to be repeated with additional comparison circuitry enabled, that repeated lookup could be performed with all of the previously disabled sets of comparison circuitry which correspond to valid regions of address space now enabled for the repeated lookup. It would also be possible for only some of the previously disabled sets of comparison circuitry corresponding to valid regions to be re-enabled for the repeated lookup. However, re-enabling all of the previously disabled sets of comparison circuitry associated with valid regions of address space can reduce the likelihood that the repeated lookup also mismatches against all of the valid regions to reduce the latency penalty. In some implementations, in the repeated lookup, the one or more sets of comparison circuitry that were previously enabled for the original lookup can be disabled for the repeated lookup, to save power because it is known from the fact that the original lookup did not identify a matching region that these previously enabled sets of comparison circuitry would detect a region mismatch and so do not need to be checked again in the repeated lookup.

Note that not all of the sets of comparison circuitry may have valid regions associated with them (e.g. if the total number of valid regions required for a piece of software is less than the maximum number of regions supported in hardware, then some of the comparison circuitry may correspond to invalid regions). Sets of comparison circuitry corresponding to invalid regions may be disabled regardless of the region prediction made and may remain disabled even when the repeated lookup is performed following an earlier region miss found using the enabled sets of comparison circuitry.

The region mismatch prediction can be made in a variety of ways. In general, any information indicative of regions previously found to match against target addresses of previous memory access requests can be useful in predicting which regions are likely to match for subsequent memory access requests. However, the particular form of this information can be maintained in different ways.

In one example, the region mismatch prediction circuitry is configured to determine the region mismatch prediction based on most-recent-match information indicative of one or more most-recently-matching sets of comparison circuitry which most recently detected a region match condition for a previous attribute lookup, the region match condition for the given set of comparison circuitry arising when the target address is within the corresponding region of address space associated with the given set of comparison circuitry. The indication of which sets of comparison circuitry are the most-recently-matching sets of comparison circuitry may not be specific to any particular address, but could be tracked in general for memory access requests as a whole. This exploits the spatial and temporal locality of memory accesses to provide a relatively circuit-area-efficient approach for generating a region mismatch prediction. Hence, one or more not-recently-matching sets of comparison circuitry, other than the most recent N sets of comparison circuitry indicated by the most-recent-match information as having recently detected the region match condition, can be predicted to detect the region mismatch condition.

In some examples, N=1. In general, it is more likely that a given memory access request will hit against the same address space region as the preceding memory access request, than that it will hit against a different address space region to the preceding memory access request, and so a particularly low overhead approach can be for the most-recent-match information to track which one of the sets of comparison circuitry is the single most-recently-matching set of comparison circuitry, and predict that all other sets of comparison circuitry will encounter the region mismatch condition.

However, some software may use multiple pointers which may mapped to different regions of address space, and may switch between use of those pointers within a given section of program code. With the N=1 approach, such software may not see the benefits of the region mismatch prediction and disabling of comparison circuitry. Nevertheless, the N=1 approach can still be useful because the majority of software may not use such multiple pointers for temporally localised accesses and so can still benefit from power savings, and so the average power consumption across different software workloads may still be reduced.

In other examples, N>1. This means that the region mismatch prediction circuitry can maintain the most-recent-match information to track the two or more sets of comparison circuitry for which the region match condition was most recently detected, and predict that the other not-recently-matching sets of comparison circuitry, other than the two or more matching sets indicated by the prediction tracking indication, will encounter the region mismatch condition. This approach helps to reduce the performance penalty when software switches between a relatively limited set of pointers accessing a limited subset of regions.

Either way, the particular value of N (the number of regions or sets of comparison circuitry for which recent-match-information is retained) can be chosen by a system designer depending on the desired trade-off between power saving and performance. It is also possible for N to be a dynamically varying value which can be determined at runtime by the region mismatch prediction circuitry. For example, N could initially start at 1 but be increased if mismatches are occurring more frequently than a certain threshold. Also, it is possible for N to be a software-configured value which can be set by software (e.g. by writing a control value to a control register).

The most-recent-match information can identify the one or more most-recently-matching sets of comparison circuitry separately for instruction memory access requests and data memory access requests. Hence, when the memory access request is an instruction memory access request, the region mismatch prediction circuitry can determine the region mismatch prediction based on an indication of the one or more most-recently-matching sets of comparison circuitry for instruction memory access requests, and when the memory access request is a data memory access request, the region mismatch prediction circuitry can determine the region mismatch prediction based on an indication of the one or more most-recently-matching sets of comparison circuitry for data memory access requests. This recognises that often the instructions for a particular piece of software may be stored in a different region of address space from the data that will be accessed by the software, and the address regions storing the instructions and data may be associated with different memory access control attributes (for example, unlike the region storing the data, the region storing the instructions may be defined as an executable region from which instructions are allowed to be executed). Hence, typically the most recent matching set of comparison circuitry can be different for instruction memory access requests compared to data memory access requests, and so it can be useful to track these separately. In practice, many processor microarchitectures may have separate memory access control circuit units for checking instruction and data accesses respectively, so the respective units could maintain independent sets of most-recent-match information. Nevertheless, even if a combined memory access control circuit unit is used for both instruction and data accesses, separate sets of most-reason-match information can be maintained for use in controlling the comparison disabling when looking up attributes for instruction and data accesses respectively.

Another approach to region mismatch prediction can be to use region mismatch prediction metadata associated with an address operand used to generate the target address of the memory access request to determine which sets of comparison circuitry of the memory access control circuitry will be predicted to detect a region mismatch condition and so can be disabled. Hence, the processing circuitry may generate the target address of the memory access request based at least on an address operand (the target address could also depend on other parameters such as an immediate value specified in a load/store instruction which could be added to the address operand to form the target address), and the region mismatch prediction circuitry may determine the region mismatch prediction based on region mismatch prediction metadata associated with the address operand. This can offer finer-grained control, because the behaviour regarding which region matched for an access associated with a particular address pointer can be tracked using the metadata specific to that pointer, to distinguish between different behaviours for accesses that rely on different address pointers. This can increase the likelihood of the region mismatch prediction being correct, even when software switches between accesses using different pointers.

The region mismatch prediction metadata can be maintained in different ways. In one example, where the address operand for generating the target address is obtained from a source register, the region mismatch prediction metadata may be associated with that source register. For example, a set of general purpose registers may provide each register with an architecturally hidden portion which can be used to store the region mismatch prediction metadata associated with the corresponding register. This hidden portion may not be accessible to software using instructions which specify those registers, but may be visible to the memory access control circuitry for use by the region mismatch prediction circuitry in generating the region mismatch prediction for a given memory access.

Some architectures support use of capabilities, which comprise a pointer and use-limiting information (constraint metadata) for constraining valid use of the pointer or the capability. Software to be executed by a data processing apparatus may typically be written in a high-level programming language and then compiled into program code according to the instruction set architecture supported by the apparatus on which the software is to be executed. For example, the software may originally be written in a higher level language such as Java®, C or C++, and then compiled into a natively supported instruction set architecture such as x86, or AArch64 provided by Arm®. Some higher level programming languages, such as Java, are considered memory-safe languages because they include runtime error detection checks for checking for certain errors relating to memory accesses. In contrast, memory-unsafe languages, such as C and C++, do not include such runtime error checks. The enduring prevalence of use of memory-unsafe languages means that in compiled program code according to a given instruction set architecture, there may be a large number of memory related errors, such as bounds violations, where an array index supplied by program code is outside legitimate bounds of an array, use-after-free errors where an access to a memory location is made after that memory location has already been deallocated or freed for use for another purpose, use-after-return where a memory access to an address associated with a variable used within a function is made after already returning from the function, and so on. Such errors may be vulnerable to exploitation by a malicious party or may cause the program to fail in unpredictable ways. Non-capability-based memory protection techniques tend to be relatively coarse-grained in that access permissions for respective regions of memory tend to be defined at the level of an individual process or thread accessing a region of memory, rather than being tied to a particular memory access to program code or data objects being performed within a given part of a thread or process (enforcing different attributes on different portions within the same thread or process would require supervisory software overhead in changing the region attributes between executing those portions). In contrast, in a capability-based architecture, capability registers may be provided to store capabilities, where a capability comprises a pointer and use-limiting information for constraining valid use of the pointer or the capability (e.g. the use-limiting information can define address bounds within which the pointer is allowed to be used to initiate an access, or permissions for use of the pointer). There may be a mechanism to verify that capabilities are validly formed and to ensure that the constraint metadata passes with the pointer if the pointer is stored to memory and later read back into registers. This approach means that when a particular pointer of a capability is referenced to perform a particular data or instruction access, the associated metadata for constraining that access is provided in the capability itself. Different accesses to the same address from different instructions within the same process can reference different capabilities and hence be subject to different constraints. Therefore, a capability-supporting architecture can enable more fine-grained compartmentalisation of software running on the processing circuitry, making it harder for attackers to exploit memory usage errors.

Hence, in an implementation which supports use of capabilities, the address operand used to generate the target address of the memory access request could be a capability providing a pointer for use in determining the target address and use-limiting information indicative of permitted usage of the pointer. In some capability architectures, a capability may have some spare encoding space which can be used for non-architecturally-defined metadata. Hence, one option for representing the region mismatch prediction metadata can be to indicate this within a portion of a capability used to form the address operand of the memory access request. This can enable the region mismatch prediction metadata to be maintained at relatively additional cost beyond that already provided to support capabilities. Also, use of capability metadata to represent the region mismatch prediction metadata can help to preserve the region mismatch prediction metadata even if the address operand is written out to memory due to register pressure, as capability architectures may generally ensure that the metadata associated with a capability flows with the capability as the capability is transferred between registers and memory. This may help to increase the likelihood that, for a given memory access specifying a given operand, region mismatch prediction metadata is available that can be used to predict which sets of comparison circuitry can be disabled to save power, even when successive accesses based on a given pointer are separated in time so that by the time the second access is made the pointer has already been written to memory and read back into registers since the first access was made.

It will be appreciated that support for capabilities is optional and so other approaches can also be used to indicate the region mismatch prediction metadata associated with a particular address operand, such as providing an additional hidden portion of a general purpose register. Even in an architecture that does support capabilities, it may still be useful to support such region mismatch prediction metadata for general purpose (non-capability) registers, because not all software executed on an architecture supported capabilities may actually use the capabilities.

Regardless of where the region mismatch prediction metadata is stored, the region mismatch prediction metadata can be represented in different ways. In general, the metadata can identify any information that is indicative of at least one selected set of comparison circuitry (which could be a set of comparison circuitry predicted to encounter the region mismatch condition or a set of comparison circuitry predicted to encounter the region match condition, either of which provides information useful for making the region mismatch prediction). For example, the at least one value indicative of the selected set of comparison circuitry can comprise at least one of: an address space region identifier associated with a corresponding region of address space associated with the selected set of comparison circuitry; a hardware structure identifier associated with the selected set of comparison circuitry; and information for identifying a memory system location storing the at least one memory access control attribute associated with the selected set of comparison circuitry (this information for identifying the memory system location could be expressed as a memory address, or as a node indication identifying which node of a data structure (e.g. a linear or hierarchical table structure) provides the at least one memory access control attribute for a given region of the address space which corresponds to the selected set of comparison circuitry). Hence, the metadata can indicate the selected set of comparison circuitry in various ways, including use of a direct indication of the comparison circuitry hardware structure corresponding to the selected set of comparison circuitry, or a more indirect indication associated with the address space region or a location in memory that corresponds to the address space region, and so can be used to identify the selected set of comparison circuitry.

In some examples, the region mismatch prediction circuitry may provide the region mismatch prediction to indicate that the at least one selected set of comparison circuitry indicated by the region mismatch prediction metadata for a given address operand should be excluded from being disabled by the comparison disabling circuitry for attribute lookups based on a target address generated based on the given address operand. That is, it may be more efficient for the region mismatch prediction metadata to indicate information about the set of comparison circuitry associated with a region for which the region match prediction is predicted to be detected, as this may require indications of fewer regions than if the metadata indicates regions associated with region mismatch predictions.

The region mismatch prediction circuitry may maintain the region mismatch prediction metadata associated with a given address operand based on match/mismatch detections performed for previous memory access requests. Hence, in response to a given attribute lookup performed for a memory access request based on a target address associated with a given address operand, the region mismatch prediction circuitry may update the region mismatch prediction metadata associated with the given address operand based on which of the plurality of sets of comparison circuitry detected the region mismatch condition during the given attribute lookup. This update of the region mismatch prediction metadata can take various forms. For example, in some cases where no previous metadata was associated with the given address operand or the metadata was invalid or previously cleared, the region mismatch prediction metadata may be set to become valid corresponding to the result of the given attribute lookup. Also, in cases where some previous metadata was indicated for the given address operand, the update may comprise changing which set of comparison circuitry is predicted as not detecting the region match condition for accesses based on the given address operand, or could comprise an update to indicate that more than one set of comparison circuitry should be predicted as detecting the region match condition for future lookups (for example, this could be useful if it is detected that accesses based on a given address pointer have been found to match against multiple regions). In some cases, the update could also comprise updating the region mismatch prediction metadata to indicate that on future lookups for an address based on the given address operand, all the sets of comparison circuitry corresponding to valid regions should be enabled (this can be useful if it is found that region mismatch prediction is difficult to predict accurately for a particular address operand whose behaviour keeps changing).

The updating of the region mismatch prediction metadata can take place at different times. In some cases, the updates may occur on demand, when the given address operand is used to generate the target address for a current memory access and the previously indicated region mismatch prediction metadata is found not to accurately predict the region expected to mismatch.

However, it is also possible to update the region mismatch prediction metadata at times other than when there is a memory access request pending that uses the corresponding address operand. Hence, in a cycle in which there is no pending memory access request for which an attribute lookup is to be performed, the region mismatch prediction circuitry is capable of performing an additional attribute lookup based on a target address generated from a given address operand, to maintain the region mismatch prediction metadata associated with the given address operand based an outcome of the additional attribute lookup. For example, in spare cycles where there is no need to perform an attribute lookup for memory access requests initiated by the software being executed, the region mismatch prediction circuitry can use that time to perform a lookup solely for the purpose of maintaining the region mismatch prediction metadata, which will then tend to increase the likelihood that subsequent region mismatch predictions are accurate for later memory access requests initiated by the software being executed.

The region mismatch prediction circuitry can invalidate or update the region mismatch prediction metadata associated with an address operand when it is determined that the metadata may no longer be accurate. For example, the region mismatch prediction circuitry is configured to invalidate or update the region mismatch prediction metadata associated with an address operand in response to at least one of: an attribute reconfiguration operation for reconfiguring the at least one memory access control attribute for at least one region of address space; a memory access control circuitry reconfiguration operation for reconfiguring which region of address space is the corresponding region for at least one of the plurality of sets of comparison circuitry; a memory access control attribute cache invalidation operation for invalidating one or more cached memory access control attributes for at least one region of address space; and a change to the address operand. The first three of these options can be an indication that the configuration of the memory access control circuitry or the underlying definition of attributes and/or region definitions has changed, so that previously stored region mismatch prediction metadata can be cleared or recalculated to prevent the predictions of which sets of comparison circuitry should be enabled/disabled being based on out of date information. When region mismatch prediction metadata invalidation or recalculation is performed in response to the attribute reconfiguration operation, memory access control circuitry reconfiguration operation or memory access control attribute cache invalidation operation, two or more address operands may have their region mismatch prediction metadata invalidated or updated as there could be multiple address operands affected by the change. Also, if the operand itself changes, addresses calculated from that operand may now correspond to a different address region, and so it may be desirable to invalidate or update the metadata to reduce the likelihood that, for subsequent accesses based on that operand, there is a misprediction of which region will match/mismatch against the target address.

In response to at least one operation that sets a destination register to a value generated from a further source register, when the further source register is associated with valid region mismatch prediction metadata, the region mismatch prediction circuitry may set the region mismatch prediction metadata associated with the destination register to a value derived from the region mismatch prediction metadata associated with the further source register. For example, for a register move instruction which causes data to be copied from a source register to a destination register, the region mismatch prediction metadata for the source register could be used to set the region mismatch prediction metadata for the destination register. Also, for some types of arithmetic instruction (e.g. an add or subtract instruction), the destination register's metadata could be set based on the source register's metadata (as address regions can be relatively large, especially for an MPU as discussed further below, it can be predicted that it is relatively likely that an addition or subtraction operation may not change which address region maps to an address generated based on the value in that register, so propagating the region mismatch prediction metadata from the source register to the destination register can help reduce the number of unnecessary comparisons performed if further memory accesses are performed later based on the value in the destination register of the previous arithmetic instruction). It may be that only a subset of types of instructions cause this propagation of metadata, and other types of instructions (e.g. divide instructions, which are more likely to cause a change to the stored data value that would change which address region maps to an address calculated from the data value) may not cause the region mismatch prediction metadata for a destination register to be set based on the region mismatch prediction metadata for a source register.

When additional metadata is associated with a particular address operand, as well as indicating a prediction of which regions will mismatch and hence which sets of comparison circuitry can be suppressed, in some cases attribute checking prediction information can also be recorded associated with a particular address operand to provide a predicted outcome of checking the at least one memory access control attribute associated with an address region for which the match is predicted to be detected. This can allow the entire lookup of all the sets of comparison circuitry to be suppressed if the outcome of checking the attribute can already be predicted based on the attribute checking prediction. For example, the attribute checking prediction information could be an indication of whether any permission checks based on attributes associated with a region matching the target address derived from the address operand were previously found to be passed.

Hence, when the address operand is also associated with a valid attribute checking prediction indicative of a predicted outcome of checking the at least one memory access control attribute associated with a region of address space for which one of the plurality of sets of comparison circuitry detects a region match condition, the lookup circuitry may suppress the attribute lookup for the memory access request specifying the target address generated based on the address operand, and the memory access control circuitry is configured to control handling of the memory access request based on the valid attribute checking prediction. This can further save power in cases where the predicted outcome of checking can be determined from information derived from previous accesses.

The attribute checking prediction information can be maintained based on the outcome of checking memory access control attributes on previous access requests specifying a target address generated based on the corresponding address operand. If an event is detected which indicates that the attribute checking prediction information may no longer apply than the attribute checking prediction information can be invalidated or updated.

In one example, the memory access control circuitry can invalidate or adjust the attribute checking prediction associated with the address operand in response to at least one of: an attribute reconfiguration operation for reconfiguring the at least one memory access control attribute for at least one region of address space; a memory access control circuitry reconfiguration operation for reconfiguring which region of address space is the corresponding region for at least one of the plurality of sets of comparison circuitry; a memory access control attribute cache invalidation operation for invalidating one or more cached memory access control attributes for at least one region of address space; and a change to the address operand.

When the attribute checking prediction is updated in response to a change to the address operand, a simple approach can simply be to invalidate the attribute checking prediction whenever the address operand is updated. However, as it is relatively common for address pointers to be incremented between one access and another, another approach can be to check whether the update of the address pointer remains within certain bounds for which the attribute checking prediction is determined to be valid (e.g. the attribute checking prediction could indicate an upper and lower bounds of the address region previously checked against the target address derived from the address pointer, and so the attribute checking prediction could remain valid until it is updated to be outside those bounds). Also, it is possible that the valid attribute checking prediction information can be recalculated when the address operand is updated, with the recalculated value of the attribute checking prediction information based on performing a further lookup of the memory access control circuitry. Another occasion when valid attribute checking predictions can be cleared or invalidated may be when there is a memory access control circuitry reconfiguration operation to change the definition of the address space regions or the corresponding attributes of those regions.

The attribute checking prediction can also be updated or invalidated when any of an attribute reconfiguration operation, memory access control circuitry reconfiguration operation and/or memory access control attribute cache invalidation operation occurs, as these operations may indicate that the previous prediction can no longer be trusted, for similar reasons to those discussed above for the invalidation/adjustment of the region mismatch prediction metadata in response to these operations.

Hence, sometimes the result of memory attribute checking may be predictable in advance to avoid any lookups be needed at all. However, for other accesses where such predictions may be unreliable then it may be preferred not to maintain valid attribute checking prediction information for the corresponding address operands, and for those address operands the memory access control circuitry may fall back on making the region mismatch predictions whereby a lookup is still performed but certain sets of comparison circuitry can be disabled to save power based on the region mismatch prediction discussed above.

Other implementations may not support the attribute checking prediction at all and so may use the region mismatch prediction technique to save power, but not predict the outcome of checking the attributes associated with the matching region of address space.

In some examples, the attributes and region-defining parameters used by the memory access control circuitry may be defined in registers provided in hardware within the processing apparatus, without the memory access circuitry having any hardware mechanism for locating region attributes within a data structure stored in memory. In that case, if software requires a greater number of regions to be defined than is supported in hardware simultaneously using the plurality of sets of comparison circuitry, software may need to periodically reconfigure the attributes or region-defining-parameters, and manage any reads from a data structure in memory.

However, in other examples, the lookup circuitry can perform the attribute lookup to determine whether the target address is within any of a cached subset of regions of address space, the cached subset of regions selected from among a plurality of regions defined in a memory-based attribute table stored in memory. The lookup circuitry may have hardware circuit logic to automatically control allocation or replacement of which of the plurality of regions are selected as the cached subset of regions, without requiring explicit software intervention. For example, a replacement policy can be used to update which regions have their attributes cached in the hardware registers of the memory access control circuitry, based on recency of access or other information.

In some examples where such caching is controlled in hardware, the lookup circuitry can control the allocation or replacement of which of the plurality of regions are selected as the cached subset of regions, based on region mismatch prediction information used by the region mismatch prediction circuitry to determine the region mismatch prediction. This exploits the fact that the region mismatch prediction information (such as the indication of the most recently accessed N regions or the regions associated with particular address operands) may indicate which address regions are likely to be "live", and so allow the lookup circuitry to determine which subset of regions is most useful to cache, to increase the likelihood that a given memory access is able to hit against one of the cached regions.

The techniques discussed above can be used for a wide variety of types of memory access control circuitry, which may define the address-region-indicating parameters and memory access control attributes in different ways.

However, these techniques can be particularly useful for memory access control circuitry (such as a memory protection unit, or MPU), that permits the at least one address-region-indicating parameter for a given region of address space to define the given region of address space as having a size corresponding to a number of bytes other than a power of 2 and/or for which the at least one address-region-indicating parameter for a given region of address space comprises separately specified first and second address boundary parameters indicating first and second boundaries of the given region of address space (e.g. the boundaries could be indicated as a start address and end address, or as a start address and size, or as an end address and size). When address regions can be defined as an arbitrary number of bytes not restricted to power of 2 sizes, this means that often the particular region matching a particular target address cannot be identified simply by indexing into a table structure using information derived solely from bits of the target address, but may require explicit comparisons against stored parameters indicating the address boundaries of the region. For determining whether the target address matches against the particular region, this may require two separate comparisons for the first and second address boundaries represented by the region-indicating-parameters. This can increase the power consumption compared to other techniques for memory protection. Therefore, the region mismatch prediction circuitry can be particularly useful for enabling the power cost to be reduced. Also, for such MPU-based approaches with arbitrary non-power-of-2 region sizes supported, it is more common that relatively large regions are defined so that there is no region boundary part way through the addresses expected to be accessed for a given portion of program code, making it more likely that a number of successive memory accesses may all correspond to the same address region, and hence increasing the likelihood of region mismatch predictions being correct. For all these reasons, the region mismatch predictions can be particularly useful for MPU-based approaches, in comparison to other types of memory attribute checking unit.

Nevertheless, the region mismatch predictions could also be used for other types of memory attribute checking unit, such for a memory management unit which has a translation lookaside buffer (TLB) for caching page table entries for address translation, where a prediction can be made of which sets of comparison circuitry for checking entries of a translation lookaside buffer (TLB) are likely to detect a TLB miss for a given access.

FIG. 1 schematically illustrates an example of a data processing apparatus 2. The data processing apparatus has a processing pipeline 4 which includes a number of pipeline stages. The processing pipeline 4 is an example of the processing circuitry mentioned earlier. In the example of FIG. 1, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional or fewer stages or a different configuration of stages. For example in an out-of-order processor a register renaming stage could be included for mapping architectural registers specified by program instructions or micro-operations to physical register specifiers identifying physical registers in the register file 14, or in a simpler pipeline there could be no issue stage (in FIG. 1 the issue stage provides for buffering of instructions or micro-operations while awaiting issue so that even if a given instruction is stalled awaiting its operands then the earlier pipeline stages can still proceed to fetch/decode later instructions, but if the issue stage is omitted then a stall of an instruction/micro-operation that is awaiting its operands may also cause the earlier pipeline stages to stall). In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a vector unit 22 for performing vector (single instruction multiple data, or SIMD) operations on vector operands comprising multiple independent data values within a single register; a floating point unit 24 for performing operations on floating-point values; a branch unit 26 for evaluating the outcome of branch operations and adjusting the program counter which represents the current point of execution accordingly; and a load/store unit 28 for performing load/store operations to access data in a memory system 8, 30, 32, 34. In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness.

Memory access control circuitry 40 is provided for controlling handling of memory access requests (e.g. load or store requests) issued by the instruction fetch stage 6 and/or the load/store unit 28 of the execute stage 16, based on at least one memory access control attribute associated with a region of address space including the target address specified by the memory access request. A number of valid regions of address space can be defined using address-region-indicating parameters, with each valid region having an associated set of one or more memory access control attributes which can be checked to determine how a memory access specifying a target address within the corresponding region should be handled. For example, the memory access control attributes could specify access permissions which indicate the conditions under which memory accesses are allowed to the corresponding region. For example the access permissions could restrict access to the region to software executing at a certain privilege level or in a certain mode of operation of the processing pipeline 4, or could restrict the types of accesses allowed. For example some regions may only be allowed to be accessed for instruction accesses but not data accesses, or vice versa, while other regions may further limit which type of data accesses (reads or writes) are allowed by defining the region as read-only, or both readable and writable. Access control attributes can also be defined to control how memory access requests to the region, when permitted, are handled, such as defining whether it is allowable to cache data obtained from memory for the corresponding region, or whether it is permitted to reorder successive memory access requests to be performed in a different order from the order in which they were issued. For systems supporting address translation, where the addresses specified by the load/store unit 28 are virtual addresses and the memory system uses physical addresses to identify memory system locations, the memory access control attributes could also specify an address translation mapping for obtaining the physical address corresponding to the virtual address specified as the target address of the memory access. It will be appreciated that many other types of access control attributes could also be defined.

One approach for implementing the memory access control circuitry 40 may be to provide a memory management unit (MMU) which checks whether memory access requests satisfy access permissions specified in page tables stored in the memory system. The address space is typically divided into regions called pages which each have a size corresponding to a power of two number of bytes (e.g. 4 kilobytes), where the start and end addresses of each page are aligned to an N-byte address boundary, where N is the size of the corresponding address region. Each page table entry specifies the access permissions for a corresponding page of the address space, and often will also specify an address translation mapping for mapping a target address in a first address space (e.g. a virtual address space) to a corresponding page of addresses in a second address space (e.g. a physical address space). The page table may be implemented as a hierarchical table structure including a number of levels of page tables, where a first subset of bits of an input address indexes into a corresponding entry of a first level page table, and the indexed entry specifies the base address of a second level page table from which an entry can be indexed based on a second subset of bits of the input address, and so on for each subsequent level of the table until eventually a final level of page table is reached where the indexed entry is selected based on some bits of the address specifies. The indexed entry contains the actual address translation attributes and access permissions required for the memory accesses targeting that page. The MMU may have a cache (called a translation lookaside buffer (TLB)) which can cache certain entries of the page tables which have more recently been accessed from the memory system, so that they can be accessed again more quickly if the processing circuitry issues multiple memory access requests requiring the same page table entry. An MMU can be useful for processors designed to handle relatively high performance workloads, for which it may be acceptable and desirable to set controls over access to many different address regions, e.g. such control may be at a 4 Kbyte granularity, and for which arbitrary mappings of address translations from any page in the first address space to any arbitrary page in the second address space may be required in order to handle accesses triggered by a number of different software processes which use the same virtual address but need to be mapped to different physical addresses used by the memory system.

However, for processors aimed at more energy-efficient workloads or designed for real time applications, an MMU may be unsuitable as the large page table structures used to define the access permissions to individual pages, and the granularity of control, may be too large for the constrained memory environment typically seen in systems aimed at more energy-efficient lower performance applications, which can have as little as two kilobytes of random access memory (RAM). Also, to facilitate using a subset of the input address bits as an index into the page tables, an MMU typically constrains each page to have a size corresponding to a power of two number of bytes. This means that if it is desired to set a certain set of access permissions only for a certain address region which has a size other than a power of two number of bytes, this would have to be represented using a number of separate page table entries each corresponding to a smaller page of a power of two number of bytes in size, with each of those individual page table entries defining exactly the same access permissions so that the set of page table entries as a whole corresponds to the larger non-power of two sized address region. This artificial partition of an address region into multiple pages is a consequence of the restriction of the page alignment to address boundaries corresponding to the size of the page, which is required in MMUs in order to enable an efficient indexing procedure using a whole number of bits from the input address for indexing into the hierarchical page structures used to cover a large address space.

However, this approach may cause problems for real time program code because it means that within a piece of program code or data intended to be governed by a given set of access permissions, the memory accesses may cross a page boundary between pages corresponding to different page table entries of the page tables, and so if the page table entry for the new page is not already cached in the MMU then this may require a page table walk to be performed to fetch the required page table entry from memory, partway through execution of a section of program code. Also, if on reaching the page boundary, it is found that the page table entry for the next page has not yet been defined in the page tables, this may cause a fault which may be slow to deal with as it may require a software exception handler to trigger an operating system or other supervising process to set the page table entry to map the required page, causing a long delay. Such delays can be highly variable and in the worst case may be extremely long, and if the section of program code issues memory accesses to addresses spanning more than two different pages then at each page boundary such delays can be incurred again. This makes it very difficult for an MMU to be able to satisfy the requirement in real time applications to have deterministic response times.

Another approach for the memory access control circuitry 40 to control access to memory can be to provide a memory protection unit (MPU), which checks whether memory access requests issued by the processing circuitry satisfy access permissions specified in a number of memory protection entries. Each memory protection entry may correspond to a particular address region of variable size within the address space. The corresponding address region for a given memory protection entry can be bounded by start and end addresses which are identified through separately-specified parameters of the given memory protection entry (e.g. using explicit start/end addresses, or through a start or end address and a size parameter). Unlike for the page tables used by an MMU, for an MPU the region corresponding to a memory protection entry may have a variable size which may be permitted to be a number of bytes other than a power of two. With this approach, it can be guaranteed that a memory address region of an arbitrary (non power of 2) size can be defined using a single memory protection entry, to avoid the risk of page walks and page faults occurring each time address accesses cross a page address boundary. This makes an MPU more suitable for systems designed for processing real time applications.

In some MPU implementations, the MPU stores each of the memory protection entries within registers provided locally in hardware within the MPU, which can be fast to access, again assisting with real time processing and avoiding the need for storing large page tables having a hierarchical structure within the memory system, which can be important for systems with limited RAM. However, in systems where all the MPU entries are stored locally within hardware registers, a disadvantage is that, as the registers which are typically directly connected to a parallel bank of comparators for comparing the target address to be accessed with the region identifying parameters of each memory protection entry stored in the registers, and each region may require separate comparisons against the start and end boundaries of the region, the power and area associated with an MPU scales badly as the number of memory protection entries supported by the MPU increases. In practice, this may mean that the number of memory protection entries supported may be limited to a relatively small number, e.g. 8 or 16. The limited number of memory protection entries in a typical MPU may cause an impact on the performance achieved by software executing on the processing system. For example, a piece of software may require a greater number of distinct address regions to be defined with different access permissions than is supported in hardware in the number of protection entries supported by the MPU. In this case, at any given time at least some parts of the address space required to be accessed by that software will not currently have a corresponding memory protection entry defined for it. This would mean that an access to an address in a currently undefined region of the address space would trigger an exception which would then require software to step in and reconfigure the registers of the MPU, so as to overwrite the parameters previously defined for a different region with the parameters required for the region needed to be accessed now. If a later instruction then accesses the previously defined region which has been overwritten, this may then cause the MPU configuration to be switched back again. This constant switching of the contents of the MPU registers, needing an exception to trigger the switching each time, may greatly harm performance. Another example can be where the processor needs to execute multiple pieces of software which are mutually distrustful, but which need to share data between them. To enable the sharing of data a given piece of software may wish to divide up portions of the address space so that only limited portions of the address space are accessible to other processes, but to provide such fine degree of control over access to the address space, this may require additional address regions to be defined, and there may not be enough spare memory protection entries supported by the MPU in hardware to allow such fine grained control. Hence, in practice the same data may end up being copied into multiple parts of the address space, one copy in the part accessed by the first software and another in the part accessed by the second software, which results in time being wasted to perform the copying and inefficient use of the memory capacity available, which can be a particular problem in systems with constrained memory resources.

Hence, some MPU implementations may also support MPU entries being obtained from a memory-based memory protection table including a number of memory protection entries which each specify access permissions for a corresponding address region of variable size within an address space, each entry also specifying region identifying parameters for identifying a start address and an end address of the corresponding address region. The MPU permits the variable size to be a number of bytes other than a power of 2, and MPU memory access circuitry can be provided to initiate at least one memory access request for accessing the memory protection table from the memory system. Hence, by providing the memory protection table in the same memory system for which access is policed by the MPU, this provides the flexibility to provide a greater number of memory protection entries then is practical for a typical MPU restricted to checking entries defined in hardware-based registers storing region defining data for each entry which is compared in parallel to a target address. In addition to the support for accessing the memory protection table defined in the memory, a set of hardware-based registers can be provided within the MPU, for caching a subset of the MPU entries from the memory-based memory protection table, and/or for supporting definition of a static set of MPU entries which can be configured for relatively frequently accessed regions of memory to provide a faster lookup for those frequently accessed lookups. By combining caching and/or statically defined entries with a wider set of entries defined in the memory-based table which can be accessed in cases when a lookup misses in the cached/statically-defined entries, this can provide a balance between performance (based on support for a larger set of memory regions overall) and reduced hardware/power overhead (as it is not necessary to allocate a total number of sets of registers and associated comparison circuitry corresponding to every region for which MPU data is defined in the memory-based table).

Hence, it will be appreciated that the memory access control circuitry 40 can be implemented in a wide variety of ways. The example discussed below is discussed in the context of an MPU (which could either be an MPU restricted to using MPU entries in hardware registers, or could be an MPU which also supports access to memory to locate MPU entries), but similar techniques could be applied for suppressing comparisons performed in a lookup of a TLB of an MMU if desired.

As shown in FIG. 1, in some implementations separate memory access control units may be provided for controlling memory attribute lookups for instruction accesses initiated by the fetch stage 6 and data accesses initiated by the load/store unit 28 respectively. For example, the memory access control circuitry 40 may include an instruction MPU 42 for controlling attribute lookups for the instruction fetch accesses and a data MPU 44 for controlling attribute lookups for the data accesses.

Figure 2:
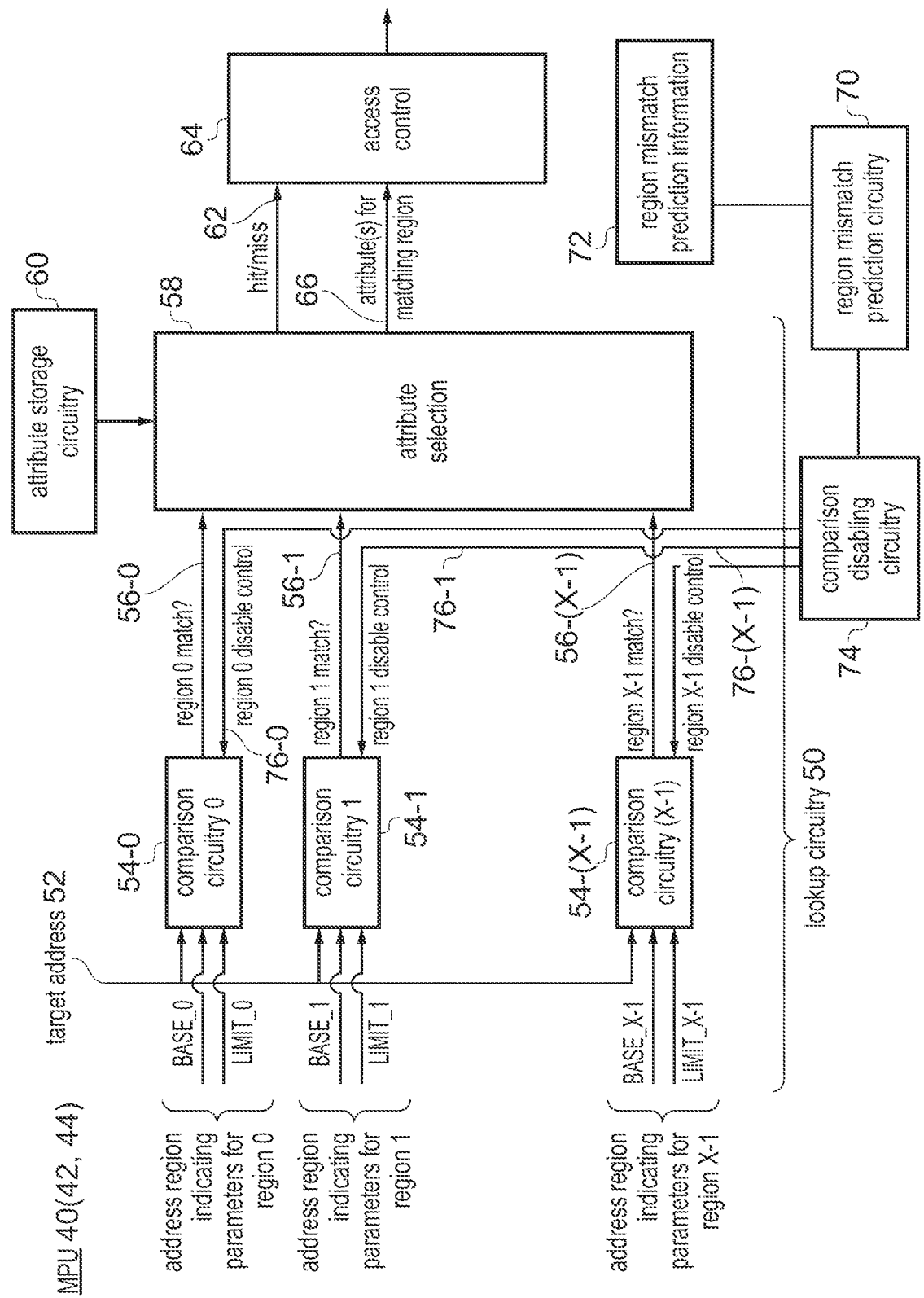
FIG. 2 illustrates an example of the memory access control circuitry, including region mismatch prediction circuitry and comparison disabling circuitry.

FIG. 2 illustrates an example of a memory protection unit (MPU), which is an example of the memory access control circuitry 40. The MPU shown in FIG. 2 could be either the instruction MPU 42 or the data MPU 44. The MPU has lookup circuitry 50 for looking up whether a target address 52 of a memory access request falls within one of a number of address regions for which valid address region indicating parameters are defined for comparison against the target address 52. Several sets of comparison circuitry 54 are provided in hardware for comparing the address region indicating parameters against the target address 52 for a certain maximum number of regions X supported in hardware (not all of the X regions need to be defined as valid, with validity of each region depending on software configuration). Hence, in this example, there are X sets of comparison circuitry 54-0 to 54-(X−1). X could be 8, 16, 32 or 64 for example.

In this example, the address region indicating parameters for a given region i include a base address BASE_i and a limit address LIMIT_i, where the base address and limit address indicate the start and end addresses of the corresponding address space region. It will be appreciated that the base and limit addresses could also be represented in other ways, such as defining one of the base address and limit address using a size parameter or offset relative to the other of the base address and limit address. As the regions may be designed to have a size corresponding to a non-power of 2 number of bytes, it is not sufficient to detect the correspondence between the target address 52 and a single limit address (masked based on region size) as is possible when region sizes are restricted to a power of 2, and so each set of comparison circuitry 54 may include at least two address comparators to compare the target address 52 against both the lower and upper address boundaries of the corresponding region. A region match signal 56 is generated by each set of comparison circuitry 54 indicating whether the target address 52 was found to match against the corresponding region, and attribute selection circuitry 58 selects the attributes associated with a matching region based on the region match signals 56 output by each set of comparison circuitry 54. The attribute selection circuitry 58 outputs a hit/miss signal 62 to access control circuitry 64, indicating whether any of the valid regions for which comparisons were performed by the sets of comparison circuitry 54 detected a region match condition. If one of the sets of comparison circuitry 54 corresponding to a valid region identified the region match condition, then the hit/miss signal 62 indicates a hit and this indicates that a set of one or more memory access control attributes 66 selected by the attribute selection circuitry 58 for the matching region and forwarded to the access control circuitry 64 is valid, and therefore that the access control circuitry 64 can control handling of the memory access request based on the set of attributes, to either allow the access to proceed or signal a fault depending on the result of checking the attributes. On the other hand, if all of the sets of comparison circuitry 54 detect the region mismatch condition then the miss signal 62 indicates that a miss occurred, and this indicates the access control circuitry 64 that the values on the signal path used to provide the attributes 66 are invalid. In this case, the miss can be handled in different ways. In an MPU which supports access to MPU entries defined in a backing structure within memory, on a miss in all the hardware-implemented comparison circuits, an access to memory may be triggered to obtain an MPU entry from the memory-based backing structure which can be used to check whether the access is permitted. In MPU implementations which do not support the memory-based MPU table, a fault may be triggered if none of the regions compared by the sets of comparison circuitry 54 detect the region match condition for a particular memory access, and the memory access request is blocked.

Hence, it will be appreciated that the address region indicating parameters checked by the sets of comparison circuitry 54 and the memory access control attributes stored in the attributes storage circuitry 60 could be directly programmed into hardware registers by software, or could be parameters fetched from a memory-based table set by software, under control of memory access circuit logic within the MPU which may initiate MPU access requests when it is necessary to obtain data from memory to enable checking of attributes associated with a region for which attributes were not previously stored within the MPU 40. For example, some of the sets of comparison circuitry 54 may check against region indicating parameters stored within a cache-like structure which caches information about a subset of the regions defined in the memory-based MPU table. The lookup circuitry 50 may use a replacement policy to decide which subset of regions should have their region indicating parameters (and corresponding access control attributes) cached at a given time (this replacement policy can be based on the region mismatch prediction information 72 described further below). Other sets of comparison circuitry 54 could check the target address 52 against information associated with statically-defined regions, which once configured by software, remains stored within hardware registers until explicitly invalidated or reconfigured by software, without being subject to replacement using a cache replacement policy managed in hardware.

Since all (or almost all) accesses to memory are checked by the MPU based on the lookups made by the lookup circuitry 50, this results in a high number of lookups, which translates to either increased power usage or latency. For example, a given implementation could initiate for comparisons for up to 16 or 32 regions per memory access, say, and since there will be at most one matching region, these lookups require a lot of redundant operations to be performed coming at the cost of power. This problem becomes more significant in the MPU implementations which use a memory-based MPU model as discussed above, as this will tend to encourage software to make use of a greater number of regions which means that the number of valid regions for which hardware comparisons are enabled will tend to increase (if the MPU table in memory is being used, this will tend to mean that the capacity to perform comparisons against regions defined in the hardware registers will be substantially fully utilised).

Since MPU lookups are dependent on software-issued addresses, these tend to exhibit spatial-temporal locality, i.e. that consecutive lookups are likely to access similar areas of memory, and therefore likely hitting for the same MPU region. It is therefore often redundant to check all regions, and power can be saved by reducing the number of regions that are checked.

Hence, as shown in FIG. 2 the memory access control circuitry 40 may have region mismatch prediction circuitry 70 which provides a prediction of which of the sets of comparison circuitry 54 is likely to detect a region mismatch prediction when the target address 52 of a memory access does not fall within the corresponding address region being checked by that set of comparison circuitry 54. The region mismatch prediction circuitry 70 makes this prediction based on region mismatch prediction information 72 which can be maintained in various ways as discussed further below. Comparison disabling circuitry 74 controls selective disabling of certain sets of comparison circuitry 54 by issuing disable control signals 76 to the various sets of comparison circuitry, to disable at least one of the sets of comparison circuitry 54 predicted by the region mismatch prediction circuitry 70 as likely to encounter the region mismatch prediction. When the comparison disabling circuitry 74 indicates that a particular set of comparison circuitry 54 should be disabled, power supply to the disabled set of comparison circuitry 54 can be suppressed by power gating, or inputs to the disabled set of comparison circuitry can be clamped to reduce toggling of bit values to save power.

The region mismatch prediction can be implemented in various ways.

In its simplest form, this could be through the use of a "past region" tracker. On each access, only the region that matched in the previous access is checked. If this matches, power can be saved. In the rarer cases where it does not match, a full lookup can be performed in a subsequent cycle and a small performance impact is absorbed. Assuming this occurs rarely, the performance impact would be negligible.

To avoid the risk of ping-ponging between two regions if multiple pointers to different regions are used, this could be extended to checking the past 2, or past N matched regions; this becomes a trade-off between risk of performance impact due to region miss, versus power gains. Instruction and data accesses could be tracked independently to further benefit this (and indeed, these are typically looked up in different MPU structures).

For finer-grained control, since MPU lookups depend on an address that is specified by a software pointer, an implementation might choose to attach implementation-specific sideband information to that pointer that will assist subsequent MPU lookups. This could be populated after an initial full lookup, and on subsequent lookups merely confirm it is still within bounds. As the MPU regions can be sized arbitrarily (rather than being restricted to power-of-2 sized MMU pages) software will almost always associate a software object (heap, stack, . . . ) to a single MPU region; as a result, the common case will be for the pointer to always reference the same region so power can be saved. If it is found to no longer match, a full lookup can be performed on a subsequent cycle and the new region recorded.

For example, an access is performed using a pointer contained within register r0 and the active MPU region is determined. This active region is then recorded in implementation-specific sideband information associated with r0. This could be inside implementation-specific section of the register file, or as a standalone unit. Subsequent accesses using r0 will initially only check the region indicated by the recorded information. If it matches, performance is unaffected and power is saved. In the rare cases it does not, a full lookup can be performed on the next cycle.

Sideband information associated with pointers is likely lost if the pointer is saved out to memory. Mitigation strategies are possible for this; for example in a capability architecture where pointers are associated with some metadata, this metadata could contain fields having implementation-specific meaning, and used to retain the region mismatch prediction metadata which can be preserved when the capability is saved to memory by virtue of the mechanisms already provided in capability architectures for ensuring that capability metadata passes along with the corresponding pointer when transferred to/from memory.

It should be noted that the above techniques become even more relevant for the implementations which use memory-based tables to provide MPU entries corresponding to non-power-of-2 sized address regions, where there are both more regions and increased latency to access the ranges defining each region. In this context, the implementation-specific sideband information could, instead of a region identifier, comprise a reference to a location in memory where the region walk operation needs to start. This could point directly to the region last hit, or indicate a node from which to start the search such that it has a high probability of finding a match while minimising the number of nodes needed to be scanned. In the absence of effective caching structures, which are themselves consumers of power, this would significantly benefit lookup speeds on large tables. If caches are implemented (as is useful to achieve higher performance), then the cache eviction strategy could observe the tracking information in the associated registers and determine which entries are still 'live' and likely to be used again in the future, and only evict others.

Hence, in summary:
Previously-accessed MPU regions can be tracked in implementation-specific sideband information. This can be done though:
  A simple "last-accessed" or "last-N-accessed" structure.
  Metadata associated directly with each general-purpose register capable of containing pointers.
  Metadata embedded in a capability.
On a subsequent access, the recently accessed region(s) are checked for that access, but other regions can have the associated comparison circuitry 54 disabled to save power:
  If that lookup matches against one of the regions with enabled comparison circuitry 54, the access can proceed without further lookup and power is saved.
  If it does not match, a full lookup (re-enabling previously disabled comparison circuitry 54) can occur in a subsequent cycle. Because these misses are expected to be rare, the performance penalty is expected to be negligible.
The type of tracking information is implementation-specific, but could for example be:
  The region identifier, or number.
  A memory address at which to start a memory-based MPU lookup.
  A selector identifying the hardware structure containing the region (e.g. cache, registers, memory, . . . ).
Tracking information can also be used as liveness hints to inform an MPU cache's eviction policy.
Possible further options:
The sideband information could be automatically cleared when the MPU configuration is changed.
The sideband information could be used to directly authorize the access:
  If the pointer has not changed since last access, the last access was authorized, and the MPU has not been changed since, this access can also be authorized.
  If the pointer has only incremented or only decremented, only one bound of the target range can be compared, thereby further reducing comparison power.
In case of not matching based on provided sideband information, this can be written back either to the new (correct) value, or to a marker indicating a full match check should be performed for that pointer each time the pointer is used for a memory access. This will help cases that border two regions, for example.
While the populating of sideband information can be done lazily, for example after a first access, it can be envisioned to do this opportunistically; whenever a pointer-like value is loaded, or simply present in the register file, and the MPU is not currently employed for other uses, sideband information can be speculatively populated.

Figure 3:
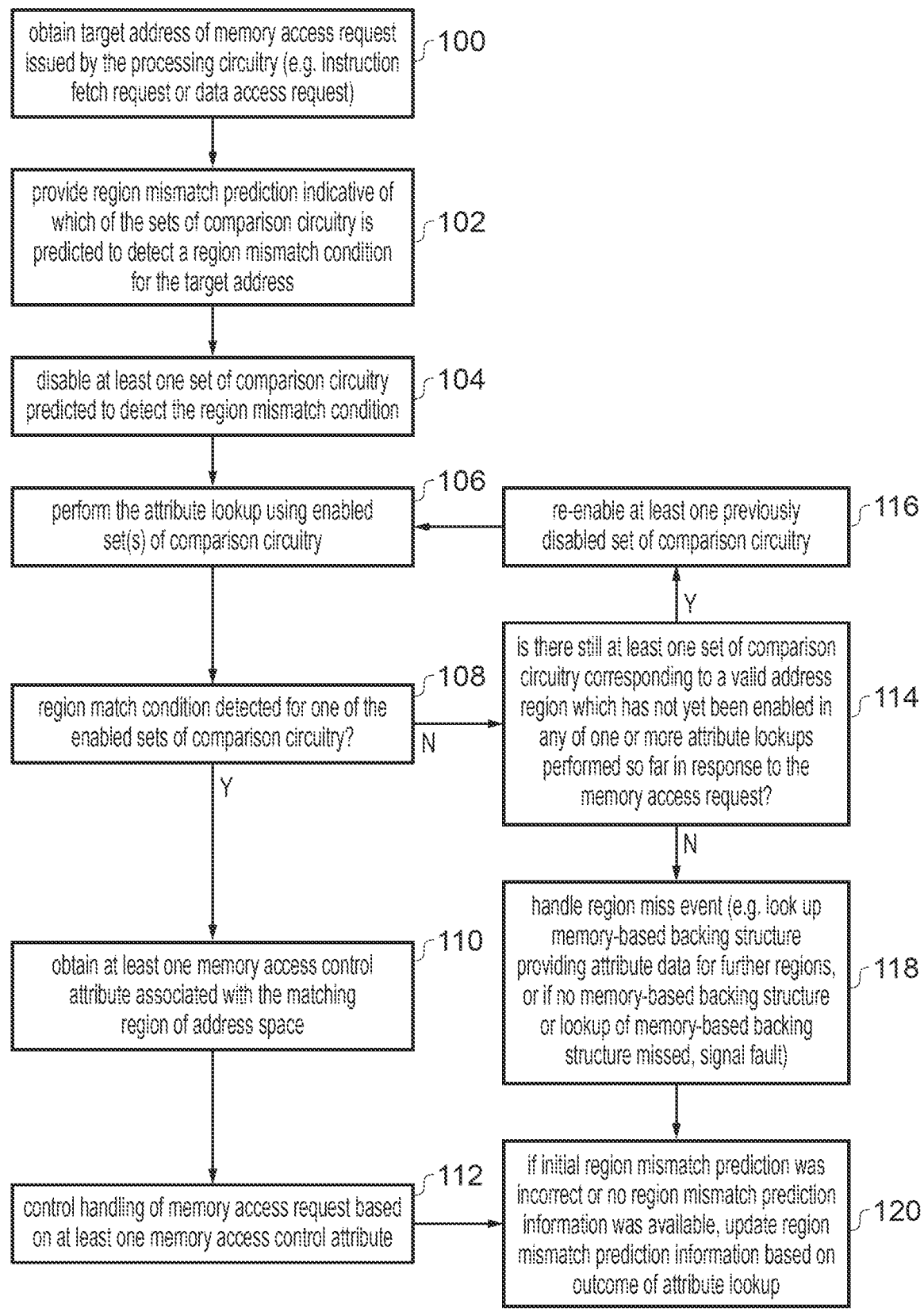
FIG. 3 is a flow diagram illustrating a method of controlling access to memory based on attribute lookups.

FIG. 3 is a flow diagram illustrating a method of handling memory access requests. At step 100 the memory access control circuitry 40 obtains the target address of a memory access request issued by the processing circuitry 4. For example, the memory access request could be an instruction fetch request issued by the fetch stage 6, for which the target address may be derived from a program counter address indicating a current point of program flow reached in the program and/or based on branch predictions made by a branch predictor. The memory access request could also be a data access request issued by the load/store circuitry 28, with the target address determined based on one or more address operands specified by a load/store instruction.

At step 102 the region mismatch prediction circuitry 70 provides a region mismatch prediction indicative of which of the sets of comparison circuitry 54 is predicted to detect a region mismatch condition for the target address. For example this region mismatch prediction could be based on a tracking indicator tracking the one or more sets of comparison circuitry 54 most recently found to detect a region match condition, or could be based on region mismatch prediction metadata associated with an address operand used to generate the target address. If no region mismatch prediction information is available, a default prediction is made, which in one possible implementation would be that all of the sets of comparison circuitry corresponding to valid regions could potentially match, and therefore none of the sets of comparison circuitry corresponding to valid regions would be predicted to detect the region mismatch condition.

At step 104 the comparison disabling circuitry 74 disables at least one set of comparison circuitry 54 predicted to detect the region mismatch condition. At step 106 the lookup circuitry 50 performs the attribute lookup using one or more enabled sets of comparison circuitry 54. At step 108 the lookup circuitry 50 determines whether the region match condition was detected for one of the enabled sets of comparison circuitry 54, and if so then at step 110 the attribute selection circuitry 58 within the lookup circuitry 50 obtains at least one memory access control attribute associated with the matching region of address space and at step 112 the access control circuitry 64 controls handling of the memory access request based on the at least one memory access control attribute. For example, the access control circuitry 64 performs access permission checks based on the at least one memory access control attribute.

If at step 108 the lookup circuitry 50 determines that none of the enabled sets of comparison circuitry 54 detected the region match condition, then at step 114 the comparison disabling circuitry 74 determines whether there is at least one set of comparison circuitry corresponding to a valid address region which has not already been enabled for any of one or more attribute lookups performed so far in response to the memory access request received at step 100. If this is the first attempt at performing a lookup, often the outcome at step 114 will be that it is determined that at least one set of comparison circuitry corresponding to a valid region remains to be checked (an exception to this could be if the number of valid regions defined by software is extremely small, to be small enough that the number of regions for which comparisons are enabled based on the region mismatch prediction actually covers all the valid regions).

Hence, if it is determined that at least one previously disabled set of comparison circuitry corresponds to a valid region and has not yet been used to check the target address in any previously performed lookup performed in response to the memory access request received at step 100, then at step 116 at least one previously disabled set of comparison circuitry is re-enabled. For example, the comparison disabling circuitry 74 may now enable all of the sets of comparison circuitry 54 which correspond to valid address regions which were previously disabled (there could still be some sets of comparison circuitry 54 which remain disabled because no valid address region information has been defined for those sets of comparison circuitry 54). In some implementations, at step 116, one or more sets of comparison circuitry 54 which were already enabled in the lookup performed at step 106 can now be disabled, as the outcome of checking whether the target address matches against those regions would already be known and so power can be saved by disabling those sets of comparison circuitry 54 in a repeated lookup (this is not essential and other implementations may, to simplify the control logic, allow the repeated lookup to enable all sets of comparison circuitry 54 corresponding to valid address regions, regardless of whether they were already enabled in the previous lookup).

The method then returns to step 106 to repeat the attribute lookup using the re-enabled sets of comparison circuitry 54 (as mentioned above, in some implementations the previously looked up sets of comparison circuitry could be disabled for this repeated lookup if it is already known that those lookups will detect the mismatch based on the previous lookup). For the repeated lookup, the method continues through steps 108, 110, 112 as before, in the case when a region match condition is now detected for one of the enabled sets of comparison circuitry.

However, if at step 114 following a region miss event when it is determined that all sets of comparison circuitry 54 corresponding to a valid address region have been enabled in at least one of the one or more attempts at performing an attribute lookup for the memory access request received at step 100, so that there are no remaining sets of comparison circuitry 54 that can be re-enabled that would be capable of detecting a region match, then at step 118 the memory access control circuitry 40 handles the region miss event using an approach which will depend on the particular implementation of the memory access control circuitry. For example, if a memory-based backing structure is provided for storing attribute data for further regions, on a region miss the memory access control circuitry 40 can trigger a lookup of the memory-based backing structure. On the other hand, if the memory-based backing structure is not supported, or if on a lookup of such a memory-based backing structure a further miss is detected in that memory-based backing data structure, a fault may be signalled and the memory access request received at step 100 may be blocked from being processed.

Following step 112 or 118, if the initial region mismatch prediction made at step 102 was found to be incorrect, or no region mismatch prediction information was available and so at step 102 a default prediction that all of the regions could potentially match was made, then at step 120 the region mismatch prediction circuitry 70 can update the region mismatch prediction information based on the outcome of the (initial or repeated) attribute lookup. For example, the region mismatch prediction information is updated to indicate which region was found to match, or to clear information about a previous prediction found to be incorrect. It is not essential to always update the region mismatch prediction. For example, in some implementations a confidence indication may be maintained and so if an incorrect prediction occurs then the confidence could be reduced, and then when the confidence drops below a threshold, the region mismatch prediction information itself can be updated or invalidated (this approach can prevent a single occurrence of an incorrect prediction from causing an otherwise useful prediction to be discarded).

Figure 4:
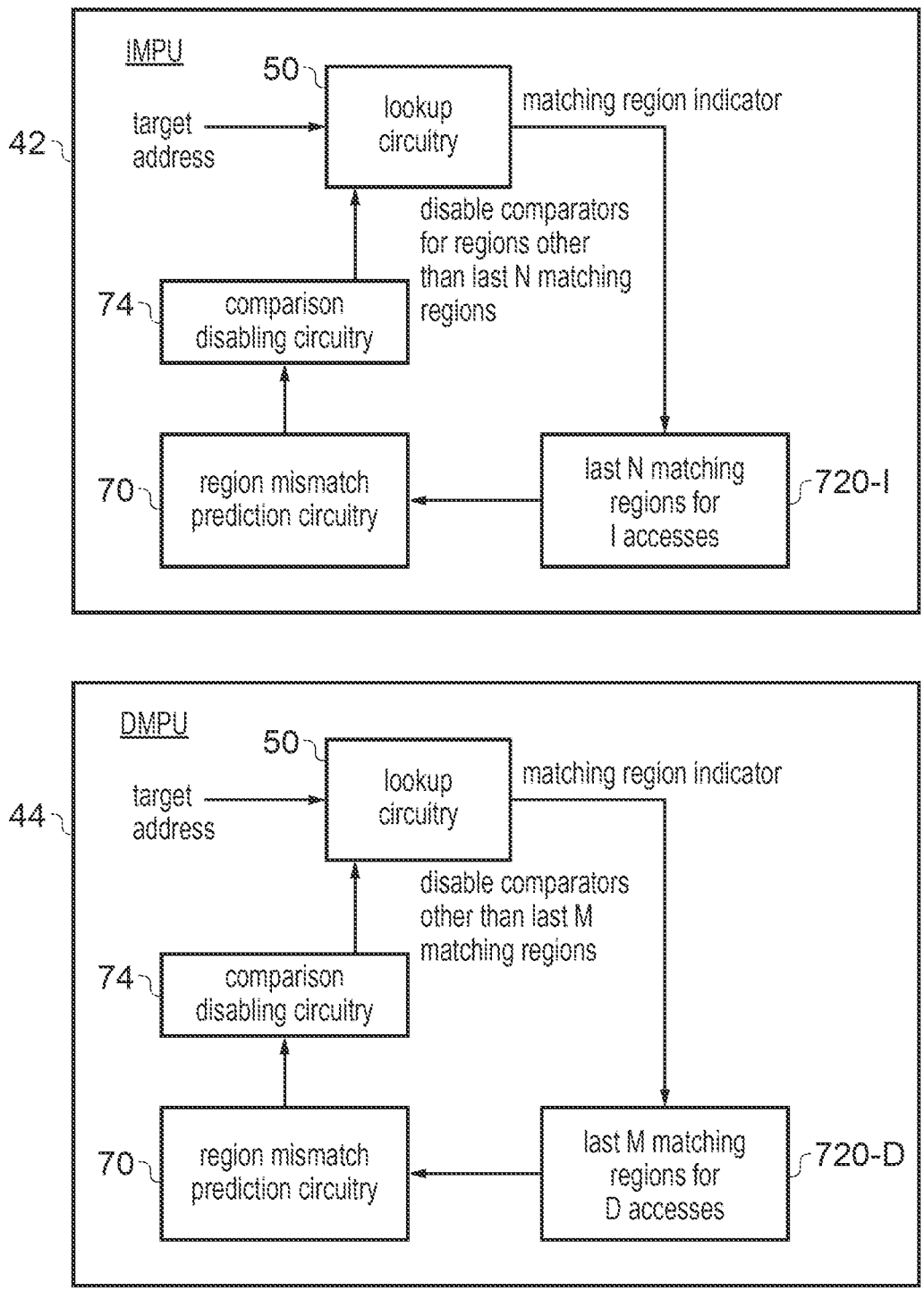
FIG. 4 illustrates an example of region mismatch prediction based on detecting the most recently matching regions.

Some particular examples of making the region mismatch prediction are described below. FIG. 4 shows an example of the memory access control circuitry 40 where separate units 42, 44 are provided for handling instruction and data memory accesses respectively. Again, each of the instruction MPU 42 and the data MPU 44 include lookup circuitry 50, region mismatch prediction circuitry 70 and comparison disabling circuitry 74 as discussed earlier. For conciseness the comparison circuitry 54 is not indicated explicitly in FIG. 4 but is still part of the lookup circuitry 50. In this example, the region mismatch prediction information 72 is most-recent match information 720 indicating the most recently matching regions for which a region match condition was identified for the instruction accesses and data accesses respectively. The instruction MPU 42 and the data MPU 44 maintain separate instances of the most-recent match information 720-I and 720-D respectively. The number of regions indicated by the most-recent match information can differ for the instruction MPU 42 compared to the data MPU 44. For example, the instruction MPU may track the last N matching regions for which region match conditions are detected by the lookup circuitry 50 within the instruction MPU 42, and the data MPU 44 may track the last M matching regions for which region match conditions are detected by the lookup circuitry 50 within the data MPU 44. $N \geq 1$ and $M \geq 1$, and N can be either equal to or different from M. Hence, when making a region mismatch prediction, the region mismatch prediction circuitry 70 can predict that all the sets of comparison circuitry 54 other than the sets of comparison circuitry 54 corresponding to the regions indicated in the most-recent match information 720 are predicted to encounter a region mismatch condition and so can be disabled. If, for a particular memory access, the access mismatches against all of the enabled regions indicated by the most-recent match information 720, then when the attribute lookup is repeated with some previously disabled sets of comparison circuitry 54 re-enabled, then if the repeated lookup now hits against a different region, the most-recent match information 720 can be updated to indicate the latest matching region detected.

Figure 5:
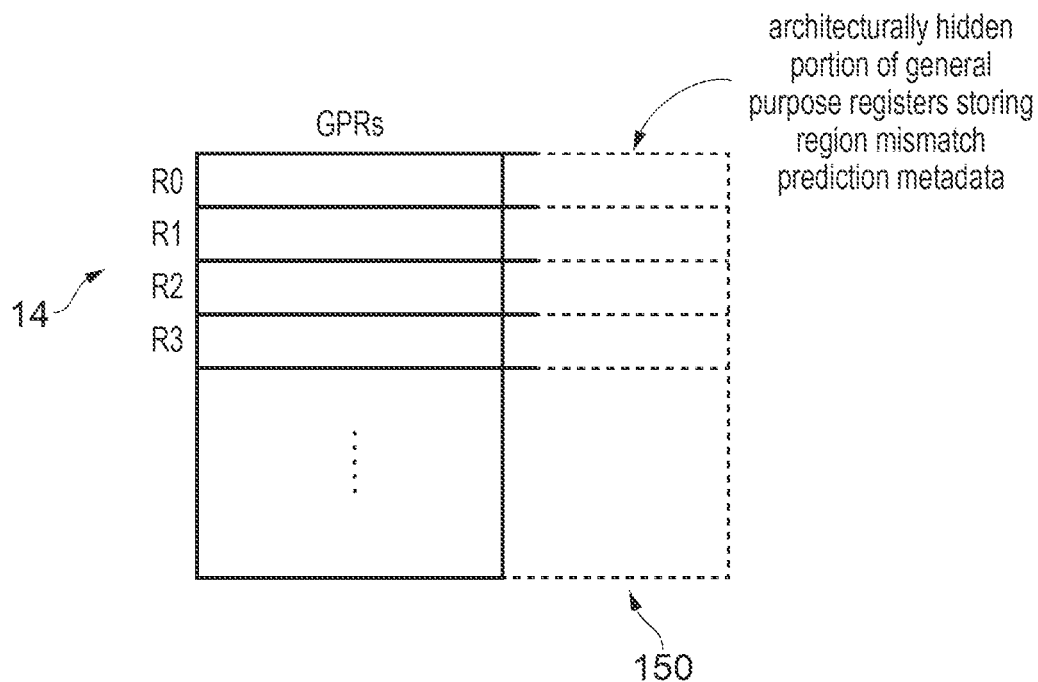
FIGS. 5 and 6 illustrate examples of using region mismatch prediction metadata associated with an address operand to perform the region mismatch prediction.

FIG. 5 shows an alternative approach for making the region mismatch prediction, which can use more fine-grained information associated with particular address operands, rather than using the most-recent match information which is tracked globally for instruction accesses or data accesses regardless of address. In the approach shown in FIG. 5, the general purpose registers provided for specifying general purpose operands for instructions may be provided with an architecturally hidden portion 150 so that each general purpose register can be assigned a corresponding item of region mismatch prediction metadata by the region mismatch prediction circuitry 70, which is not visible to software. The architecturally hidden portion 150 could be implemented within the same hardware structure as the registers themselves, or could be implemented as a distinct storage unit. When a memory access is triggered based on the target address derived from an address operand obtained from a particular one of the general purpose registers, the corresponding region mismatch prediction metadata can be updated to indicate which set of comparison circuitry 54 matched against that address (or alternatively can represent another indication of the matching region, such as a region number or an indication of a location in memory at which corresponding region data is stored, such as by specifying a memory address of the memory location storing the region's attributes, or by specifying node identifier indicating the relevant entry within a table structure). On subsequent use of the address pointer stored in that register, the previously stored region mismatch prediction metadata can be obtained from the hidden portion 150 of that register and used by the region mismatch prediction circuitry 70 to determine which comparison circuits 54 are likely to not be needed and hence control the comparison disabling circuitry 74 to save power by disabling the comparison circuits other than the one predicted to match by the region mismatch prediction metadata 150.

Figure 6:
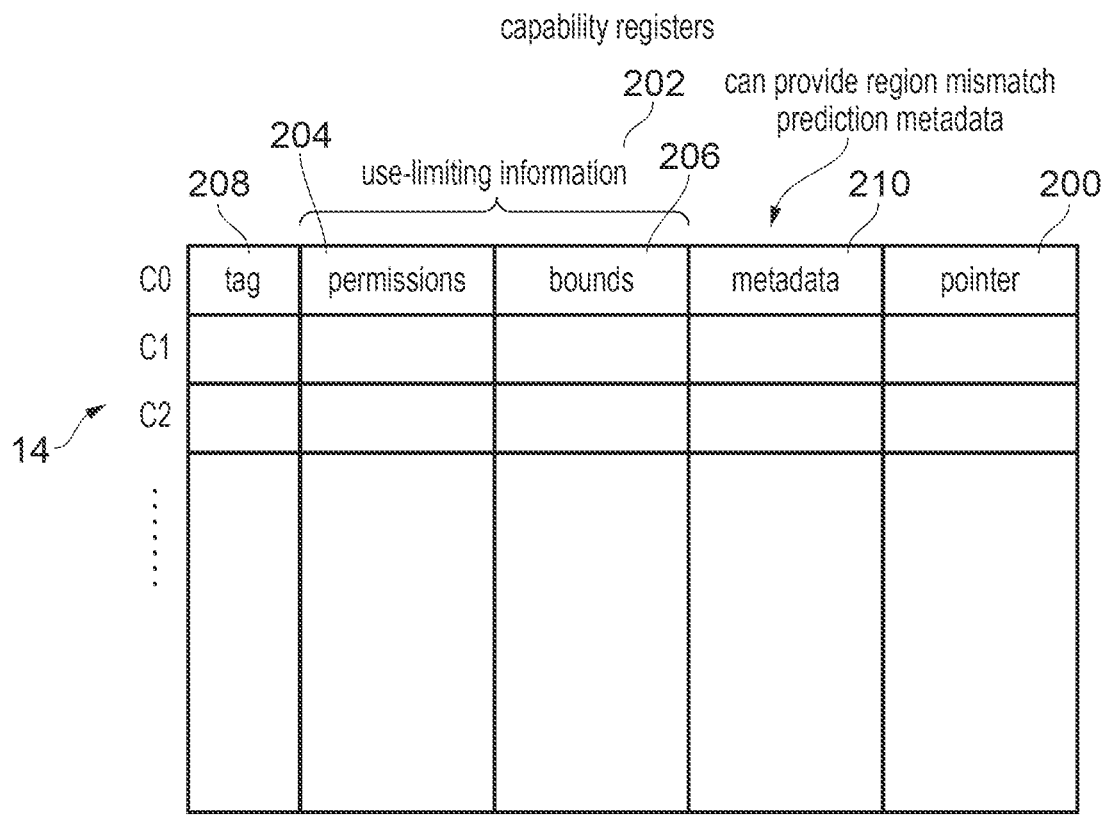

FIG. 6 shows another way of associating region mismatch prediction metadata with address operands. Some processor architectures may define, as some of the registers 14, a set of capability registers which store capabilities which provide an address pointer 200 and a set of use-limiting information 202 which can be checked to limit the valid usage of the pointer represented by the pointer field 200. For example, this use limiting information may include permission flags 204 which indicate the types of operations allowed to validly use the pointer 200 (e.g. restricting usage to read or write operations, or to certain types of instructions, for instance), and bounds information 206 which identifies permitted address bounds within which addresses derived from the pointer 200 are allowed to be used, so that a bounds check can be performed at the time of referencing the pointer associated with a particular capability register to determine whether the address derived from the pointer lies within the address bounds. A tag field 208 may also be provided to indicate that the capability information is valid and has not been tampered with (the architecture may have mechanisms for ensuring that valid capabilities associated with the tag 208 are formed through an attestable mechanism). When a capability is transferred between the registers 14 and memory, the tag field 208 and the associated use-limiting information 202 may pass along with the capability and the tag fields 208 may serve to distinguish the capability from non-capability data or instructions stored in memory.

Such capability architectures may sometimes have some spare encoding space 210 for representing additional non-architecturally-defined metadata whose meaning is not prescribed by the instruction set architecture, but is free for micro-architecture designers or software to use as needed. This spare encoding space can be used to provide, as the metadata 210, region mismatch prediction metadata associated with the corresponding capability, which can be used when a memory access is triggered based on the capability to perform the region mismatch prediction to determine which sets of comparison circuitry 54 of the memory access control circuitry 40 can be disabled to save power. For example, the metadata 210 could indicate an identifier corresponding to the set of comparison circuitry 54 (or the region corresponding to that set of comparison circuitry 54) previously found to match for an access using the corresponding capability. A benefit of this approach is that the metadata 210 will tend to flow with the capability as it is transferred between registers 14 and memory and so the metadata 210 can be preserved even if address pointers have to be spilt from registers to memory and then later loaded back into registers. This can increase the likelihood of a region mismatch prediction being able to be made to further increase the opportunity for power savings.

For both the examples of FIGS. 5 and 6, when an instruction with an instruction type in a certain subset of instruction types is executed specifying a source register and a destination register (e.g. the subset could include at least register move, add or subtract instructions, for instance), then the region mismatch prediction metadata 150, 210 associated with the destination register of the instruction could be set based on the value of the region mismatch prediction metadata 150, 210 associated with the source register. For instructions not in that subset, the region mismatch prediction metadata 150, 210 is not updated based on the metadata 150, 210 of the source register, even if the source register is associated with valid region mismatch prediction metadata 150, 210.

Hence, predictions indicated by the metadata 150, 210 can be preserved even if the address operand gets transferred from one register to another while either remaining the same (for a register move operation) or being manipulated by an arithmetic operation which is relatively unlikely to cause the address operand calculated from the value in the destination register to map to a different address region to the region corresponding to an address operand calculated based on the value in the source register. Even if (on rare occasions) the arithmetic operation (e.g. addition) causes addresses generated from the value in the destination register to map to a different address region to the one predicted as corresponding to the value in the source register, this merely causes a performance penalty the next time a memory access is initiated based on the incorrect prediction, which can be detected at step 114 of FIG. 3 and a repeated lookup can then be performed with other sets of comparison circuitry re-enabled, and then the prediction can be updated at step 120 of FIG. 3. Hence, an incorrect prediction does not affect the correctness of the functional processing result. In any case, as this event is relatively rare (most address operand updates will tend to keep the updated address within the same address region as before the update), that occasional performance penalty can be tolerated, and the increased power savings available because of propagating the region mismatch prediction metadata from one register to another (so that it is less likely that no region mismatch prediction is available for a given address operand) may greatly outweigh the occasional performance penalty of an incorrect prediction. This technique of propagating prediction metadata between registers can be applied when the metadata 150 is associated with general purpose registers as shown in FIG. 5 and/or when the metadata 210 is associated with capabilities as shown in FIG. 6.

The metadata 150, 210 can be cleared or updated in response to events such as: a change to the operand (value stored in general purpose register or pointer 200 of a capability) stored in the corresponding register, a reconfiguration of the memory access control circuitry 40 (e.g. a change to which particular regions have their parameters/attributes associated with a given one of the sets of comparison circuitry 54), a reconfiguration of the attributes or region parameters for a particular address region (e.g. an update to the underlying table of attributes/region definitions in memory) and/or detection of a cache invalidation operation which triggers invalidation of memory access control attributes or region defining parameters from a cache structure.

Figure 7:
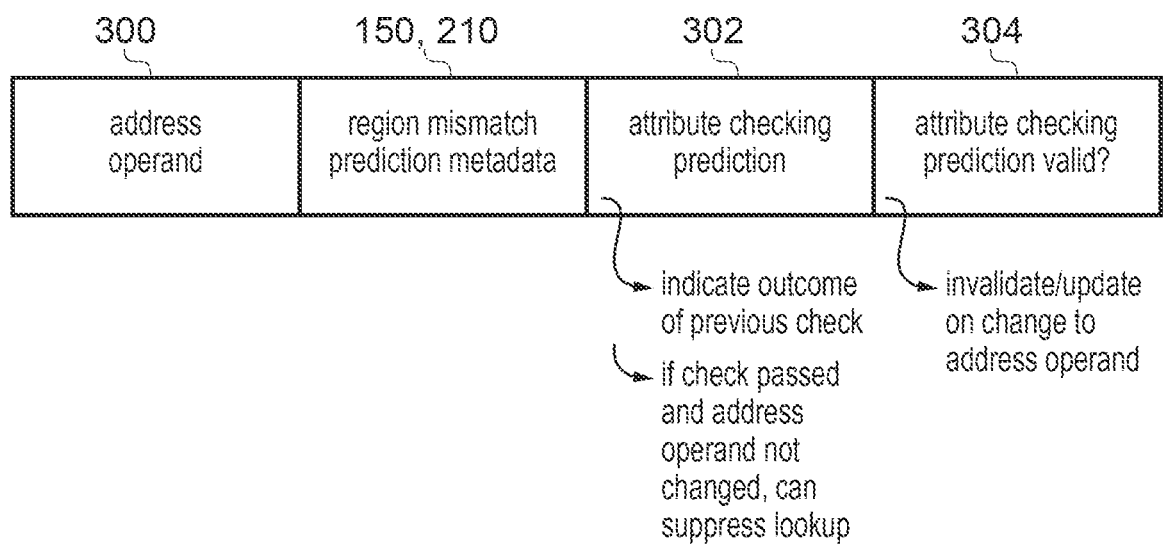
FIG. 7 illustrates an example of an attribute checking prediction indication associated with an address operand, to indicate a predicted outcome of checking the memory access control attribute for a corresponding region of address space for which a region match condition is predicted to be detected.

FIG. 7 shows a further example where an address operand 300 can be associated with region mismatch prediction metadata 150, 210 as discussed earlier (the operand 300 could be an operand in a general purpose register or a capability as shown in FIGS. 5 and 6), and where the address operand is also associated with attribute checking prediction information 302 and attribute checking prediction valid information 304 which indicates whether the attribute checking prediction information 302 is valid. While the region mismatch prediction metadata 150, 210 indicates a prediction of which regions to be checked by the memory access control circuitry 40 are likely to match against the address calculated from the address operand 300, the attribute checking prediction 302 may go further by indicating a predicted outcome of checking attributes for a matching region using the access control circuitry 64. For example, the attribute checking prediction 302 could simply be a flag indicating whether the access based on the address operand is permitted. If the attribute checking prediction information permits the access to proceed and is indicated as valid by the valid information 304, then the entire lookup of the memory access control circuitry 40 and the attribute checking by the access control circuitry 64 can be suppressed to save power. The attribute checking prediction information 302 can be set as valid when a look up is performed for an address based on the address operand 300 and the access control circuitry 64 determines that the access is permitted based on the attributes for a matching region. The attribute checking prediction 302 can be cleared or invalidated by clearing the attribute checking prediction valid information 304, when either the address operand 300 is updated in such a way that the previously indicated check is no longer valid, or the configuration of the memory access control circuitry 40 is changed to change the definition of the address regions or the memory access control attributes defined for those regions, or a memory access control attribute cache invalidation operation is detected. Hence, if a valid attribute checking prediction is made then power can be saved by not performing any lookup at all, but if there is no valid attribute checking prediction stored then the region mismatch prediction metadata could still be used to reduce power consumption of the lookup by suppressing the operation of the lease some of the comparison circuits 54.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to issue a memory access request specifying a target address; and
memory access control circuitry to control handling of the memory access request based on at least one memory access control attribute associated with a region of address space including the target address;
the memory access control circuitry comprising:
lookup circuitry to perform an attribute lookup for the memory access request to identify the at least one memory access control attribute associated with the region of address space including the target address, the lookup circuitry comprising a plurality of sets of comparison circuitry, each set of comparison circuitry to detect, based on at least one address-region-indicating parameter associated with a corresponding region of address space, whether the target address is within the corresponding region of address space;
region mismatch prediction circuitry to provide a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry; and
comparison disabling circuitry to disable at least one of the plurality of sets of comparison circuitry that is predicted by the region mismatch prediction circuitry to detect the region mismatch condition for the target address.

2. The apparatus according to claim 1, in which in response to the attribute lookup identifying that the region mismatch condition is detected for the target address by each enabled set of comparison circuitry when at least one of the plurality of sets of comparison circuitry was disabled for the attribute lookup, the comparison disabling circuitry is configured to re-enable at least one previously disabled set of comparison circuitry and the lookup circuitry is configured to repeat the attribute lookup for the given target address with the at least one previously disabled set of comparison circuitry now enabled.

3. The apparatus according to claim 1, in which the region mismatch prediction circuitry is configured to determine the region mismatch prediction based on most-recent-match information indicative of one or more most-recently-matching sets of comparison circuitry which most recently detected a region match condition for a previous attribute lookup, the region match condition for the given set of comparison circuitry arising when the target address is within the corresponding region of address space associated with the given set of comparison circuitry.

4. The apparatus according to claim 3, in which the region mismatch prediction circuitry is configured to predict that one or more not-recently-matching sets of comparison circuitry, other than the one or more recently-matching sets of comparison circuitry indicated by the most-recent-match information, will detect the region mismatch condition.

5. The apparatus according to claim 3, in which the most-recent-match information identifies the one or more most-recently-matching sets of comparison circuitry separately for instruction memory access requests and data memory access requests;
when the memory access request is an instruction memory access request, the region mismatch prediction circuitry is configured to determine the region mismatch prediction based on an indication of the one or more most-recently-matching sets of comparison circuitry for instruction memory access requests; and
when the memory access request is a data memory access request, the region mismatch prediction circuitry is configured to determine the region mismatch prediction based on an indication of the one or more most-recently-matching sets of comparison circuitry for data memory access requests.

6. The apparatus according to claim 1, in which the processing circuitry is configured to generate the target address of the memory access request based on at least an address operand; and
the region mismatch prediction circuitry is configured to determine the region mismatch prediction based on region mismatch prediction metadata associated with the address operand.

7. The apparatus according to claim 6, in which the processing circuitry is configured to obtain the address operand from a source register, and the region mismatch prediction metadata is associated with the source register.

8. The apparatus according to claim 6, in which the address operand is a capability providing a pointer for use in determining the target address and use-limiting information indicative of permitted usage of the pointer, and the region mismatch prediction metadata is indicated in a portion of the capability.

9. The apparatus according to claim 6, in which the region mismatch prediction metadata provides at least one value indicative of at least one selected set of comparison circuitry;
the at least one value indicative of the selected set of comparison circuitry comprising at least one of:
an address space region identifier associated with a corresponding region of address space associated with the selected set of comparison circuitry;
a hardware structure identifier associated with the selected set of comparison circuitry; and
information for identifying a memory system location storing the at least one memory access control attribute associated with the selected set of comparison circuitry.

10. The apparatus according to claim 9, in which the region mismatch prediction circuitry is configured to provide the region mismatch prediction to indicate that the at least one selected set of comparison circuitry indicated by the region mismatch prediction metadata for a given address operand should be excluded from being disabled by the comparison disabling circuitry for attribute lookups based on a target address generated based on the given address operand.

11. The apparatus according to claim 6, in which, in response to a given attribute lookup performed for a memory access request based on a target address associated with a given address operand, the region mismatch prediction circuitry is configured to update the region mismatch prediction metadata associated with the given address operand based on which of the plurality of sets of comparison circuitry detected the region mismatch condition during the given attribute lookup.

12. The apparatus according to claim 6, in which, in a cycle in which there is no pending memory access request for which an attribute lookup is to be performed, the region mismatch prediction circuitry is capable of performing an additional attribute lookup based on a target address generated from a given address operand, to maintain the region mismatch prediction metadata associated with the given address operand based an outcome of the additional attribute lookup.

13. The apparatus according to claim 6, in which the region mismatch prediction circuitry is configured to invalidate or update the region mismatch prediction metadata associated with an address operand in response to at least one of:
an attribute reconfiguration operation for reconfiguring the at least one memory access control attribute for at least one region of address space;
a memory access control circuitry reconfiguration operation for reconfiguring which region of address space is the corresponding region for at least one of the plurality of sets of comparison circuitry;
a memory access control attribute cache invalidation operation for invalidating one or more cached memory access control attributes for at least one region of address space; and
a change to the address operand.

14. The apparatus according to claim 6, in which, in response to at least one operation that sets a destination register to a value generated from a further source register, when the further source register is associated with valid region mismatch prediction metadata, the region mismatch prediction circuitry is configured to set the region mismatch prediction metadata associated with the destination register to a value derived from the region mismatch prediction metadata associated with the further source register.

15. The apparatus according to claim 6, in which, when the address operand is also associated with a valid attribute checking prediction indicative of a predicted outcome of checking the at least one memory access control attribute associated with a region of address space for which one of the plurality of sets of comparison circuitry detects a region match condition, the lookup circuitry is configured to suppress the attribute lookup for the memory access request specifying the target address generated based on the address operand, and the memory access control circuitry is configured to control handling of the memory access request based on the valid attribute checking prediction.

16. The apparatus according to claim 15, in which the memory access control circuitry is configured to invalidate or adjust the attribute checking prediction associated with the address operand in response to at least one of:
an attribute reconfiguration operation for reconfiguring the at least one memory access control attribute for at least one region of address space;
a memory access control circuitry reconfiguration operation for reconfiguring which region of address space is the corresponding region for at least one of the plurality of sets of comparison circuitry;
a memory access control attribute cache invalidation operation for invalidating one or more cached memory access control attributes for at least one region of address space; and
a change to the address operand.

17. The apparatus according to claim 1, in which the lookup circuitry is configured to perform the attribute lookup to determine whether the target address is within any of a cached subset of regions of address space, the cached subset of regions selected from among a plurality of regions defined in a memory-based attribute table stored in memory; and the lookup circuitry is configured to control allocation or replacement of which of the plurality of regions are selected as the cached subset of regions, based on region mismatch prediction information used by the region mismatch prediction circuitry to determine the region mismatch prediction.

18. The apparatus according to claim 1, in which at least one of:
the memory access control circuitry is configured to permit the at least one address-region-indicating parameter for a given region of address space to define the given region of address space as having a size corresponding to a number of bytes other than a power of 2; and
the at least one address-region-indicating parameter for a given region of address space comprises separately specified first and second address boundary parameters indicating first and second boundaries of the given region of address space.

19. A method comprising:
issuing a memory access request specifying a target address; and
controlling handling of the memory access request based on at least one memory access control attribute associated with a region of address space including the target address;
the controlling comprising:
performing an attribute lookup for the memory access request to identify the at least one memory access control attribute associated with the region of address space including the target address, the attribute lookup performed using lookup circuitry comprising a plurality of sets of comparison circuitry, each set of comparison circuitry to detect, based on at least one address-region-indicating parameter associated with a corresponding region of address space, whether the target address is within the corresponding region of address space;
providing a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry; and
disabling at least one of the plurality of sets of comparison circuitry that is predicted to detect the region mismatch condition for the target address.

20. A non-transitory computer-readable medium to store computer-readable code for fabrication of an apparatus comprising:
processing circuitry to issue a memory access request specifying a target address; and
memory access control circuitry to control handling of the memory access request based on at least one memory access control attribute associated with a region of address space including the target address;
the memory access control circuitry comprising:
lookup circuitry to perform an attribute lookup for the memory access request to identify the at least one memory access control attribute associated with the region of address space including the target address, the lookup circuitry comprising a plurality of sets of comparison circuitry, each set of comparison circuitry to detect, based on at least one address-regionindicating parameter associated with a corresponding region of address space, whether the target address is within the corresponding region of address space;

region mismatch prediction circuitry to provide a region mismatch prediction indicative of which of the plurality of sets of comparison circuitry is predicted to detect a region mismatch condition for the target address of the memory access request, the region mismatch condition for a given set of comparison circuitry arising when the target address is outside the corresponding region of address space associated with the given set of comparison circuitry; and comparison disabling circuitry to disable at least one of the plurality of sets of comparison circuitry that is predicted by the region mismatch prediction circuitry to detect the region mismatch condition for the target address.

* * * * *